United States Patent
Orr et al.

(10) Patent No.: US 6,455,859 B1
(45) Date of Patent: Sep. 24, 2002

(54) SELECTIVE FLOW PATH ALPHA PARTICLE DETECTOR AND METHOD OF USE

(76) Inventors: Christopher Henry Orr, Sellafield, Seascale, Cumbria (GB), CA 20 1PG; Craig Janson Luff, Sellafield, Seascale, Cumbria (GB), CA 20 1PG; Thomas Dockray, Sellafield, Seascale, Cumbria (GB), CA 20 1PG; Duncan Whittemore Macarthur, P.O. Box 1663, Los Alamos, NM (US) 87545

( * ) Notice: Subject to any disclaimer, the term of this patent is extended or adjusted under 35 U.S.C. 154(b) by 2 days.

(21) Appl. No.: 09/613,710

(22) Filed: Jul. 11, 2000

Related U.S. Application Data

(63) Continuation of application No. 09/030,693, filed on Feb. 25, 1998, now abandoned.

(30) Foreign Application Priority Data

Feb. 26, 1997 (GB) ............................................. 9704023
Feb. 5, 1998 (GB) ............................................. 9802412

(51) Int. Cl.⁷ ................................................. G01T 1/18
(52) U.S. Cl. ...................... 250/379; 250/374; 250/376; 250/394; 250/386; 250/387
(58) Field of Search ................. 250/379, 374, 250/376, 394, 386, 387

(56) References Cited

U.S. PATENT DOCUMENTS

| | | |
|---|---|---|
| 4,451,736 A | 5/1984 | Cameron |
| 4,814,608 A | 3/1989 | Dempsey et al. |
| 4,853,536 A | 8/1989 | Dempsey et al. |
| 4,926,053 A | 5/1990 | Dempsey et al. |
| 4,992,658 A | 2/1991 | Ramsey et al. |
| 5,008,540 A | 4/1991 | Dempsey |
| 5,055,674 A | 10/1991 | Kotrappa |
| 5,059,803 A | 10/1991 | Kronenberg |
| 5,107,108 A | 4/1992 | Ramsey et al. |
| 5,126,567 A | 6/1992 | Dempsey et al. |
| 5,128,540 A | 7/1992 | Stieff |
| 5,184,019 A | 2/1993 | MacArthur et al. |
| 5,187,370 A | 2/1993 | MacArthur et al. |
| 5,194,737 A | 3/1993 | MacArthur et al. |
| 5,281,824 A | 1/1994 | MacArthur et al. |
| 5,311,025 A | 5/1994 | MacArthur et al. |
| 5,514,872 A | 5/1996 | Bolton et al. |
| 5,525,804 A | 6/1996 | MacArthur et al. |
| 5,550,381 A | 8/1996 | Bolton et al. |
| 5,663,567 A | 9/1997 | Steadman et al. |
| 5,679,958 A | 10/1997 | MacArthur et al. |
| 5,877,502 A | 3/1999 | Koster et al. |

FOREIGN PATENT DOCUMENTS

| | | |
|---|---|---|
| DE | 28 35 470 A1 | 2/1980 |
| JP | 61265593 | 11/1986 |

OTHER PUBLICATIONS

Duncan MacArthur, et al., Monitoring Pipes for Residual Alpha Contamination, Spectrum Conference, Seattle, Washington, 1996.
Advertisement, Electret Ion Chambers for Alpha Measurements, Rad Elec Inc., 1998.

(List continued on next page.)

Primary Examiner—Constantine Hannaher
Assistant Examiner—Andrew Israel
(74) Attorney, Agent, or Firm—Workman, Nydegger & Seeley

(57) ABSTRACT

A method and apparatus for monitoring alpha contamination are provided in which ions generated in the air surrounding the item, by the passage of alpha particles, are moved to a distant detector location. The parts of the item from which ions are withdrawn can be controlled by restricting the air flow over different portions of the apparatus. In this way, detection of internal and external surfaces separately, for instance, can be provided. The apparatus and method are particularly suited for use in undertaking alpha contamination measurements during the commissioning operations.

22 Claims, 2 Drawing Sheets

OTHER PUBLICATIONS

Advertisement, Electret Ion Chambers for Tritium Measurements, Rad Elec Inc., 1998.
Advertisement, Electret Ion Chambers for Environmental Gamma, Rad Elec Inc., 1998.
Advertisement, Electret Ion Chambers for Radon & Thoron, Rad Elec Inc., 1998.
Rad Elec Inc., <http://www.radelec.com>, 20 pages, visited on Jan. 21, 1998.

P. Kotrappa, et al., Ion Transfer Electret Ion Chambers to Measure Alpha Surface Contamination Inside Pipes, Health Physics Society Annual Meeting, San Antonio, Texas, Jun. 29–Jul. 3, 1997.

J. Clark, Electret Ion Chambers (EIC) for Measuring Dose Equivalents in Mixed Fields of Thermal Neutrons, Fast Neutrons and Gamma Radiation, Health Physics Society Annual Meeting, San Antonio, Texas, Jun. 29–Jul. 3, 1997.

SELECTIVE FLOW PATH ALPHA PARTICLE DETECTOR AND METHOD OF USE

The present application is a continuation to U.S. patent application Ser. No. 09/030,693, filed Feb. 25, 1998 which for purposes of disclosure is incorporated herein by specific reference.

The U.S. Government has a paid-up license in this invention and the right in limited circumstances to require the patent owner to license others on reasonable terms as provided for by the terms of CRADA No. LA96C10298 and Contract No. W-7405-ENG-36 awarded by the U.S. Department of Energy.

BACKGROUND OF THE INVENTION

1. The Field of the Invention

The present invention concerns improvements in and relating to monitoring and/or detecting and particularly, but not exclusively, to monitoring of multi-surface items, such as pipes, for alpha source contamination.

2. Present State of the Art

Any item which passes time within the active area of a nuclear facility may become contaminated by radioactive material from within that area. As a result, before the item can be removed and subsequently re-used, disposed of or recycled its potential contamination needs to be evaluated. The absence of contamination may allow an item to be reused, whereas the presence of contamination may call for the item's safe disposal.

Detection and monitoring of alpha contamination of such items presents a number of difficulties, principally due to the short distance over which alpha particles can be detected. Alpha particles are stopped by 10's of micrometers of solid material and within a few centimeters in air. Detectors further away than these distances cannot detect the alpha contamination. In certain scenarios this, therefore, makes the detection of the alpha contamination very difficult, calling for close proximity scanning of the article with a detector. In other scenarios such detection is physically impracticable as the inside surfaces of, for instance, pipes, scaffolding and ducts are not readily accessible to such detectors and the detectors cannot monitor the alpha contamination through the walls of such items.

OBJECTS AND BRIEF SUMMARY OF THE INVENTION

The present invention aims to provide apparatus and methods for the successful monitoring of items for alpha contamination, with particular emphasis on poorly accessible and/or inaccessible surfaces.

To achieve the foregoing objects, and in accordance with the invention as embodied and broadly described herein, according to a first aspect of the invention we provide a method for detecting alpha sources on and/or associated with an item, the method comprising providing the item in an enclosed volume, providing a flow of gas from an inlet to the volume past the item to an outlet, the gas passing the item, at least in part, passing through an electric field formed by the application of an electrical potential to at least one of a plurality of electrical conductors, the current in at least one electrical conductor being detected.

In this way air passing over the item in the volume is partially ionized by any alpha contamination present and this can be detected when the ions are attracted to the conductors, due to the electric field, thus causing a current to flow.

The item may provide one or more discrete flow paths over its surface and/or surfaces. For instance, a pipe may have an external flow path separated from an internal flow path by the material forming the pipe. The method may further provide the division of the item's surface to form a plurality of discrete flow paths.

The method may provide for regulating the gas flow along one or more of the discrete paths.

Preferably the method provides for detecting alpha sources of one or more of the surfaces forming the discrete flow paths. The method may provide for monitoring of less than all the flow paths by blocking one or more of the flow paths to the passage of gas.

One or more of the discrete flow paths may be blocked by sealing that flow path. The seal may be provided between the item and the volume walls and/or across a flow path defined solely by the item. The flow path may be blocked by an inflatable seal. The flow path may be blocked by a variable aperture seal, such as an iris seal. The seal may be electrically non-insulating.

Where the item is of the general form of one or more walls defining a through passage, the method may provide for detecting alpha sources in the through passage and/or on the external wall(s) and/or both. Such items are typified by pipes, scaffold lengths, ducts, conduits and the like. The through passage may be blocked by a seal extending across the through passage. The external passage, between the item and the volume wall(s) may be blocked by a seal extending there between. The seal may be electrically non-insulating.

Preferably the discrete passages are blocked at, or towards, their end nearest the outlet.

The method may provide for detection using gas flow along all the discrete paths with further detection using gas flow along one or more of the discrete paths individually. All the discrete paths may be detected individually. A value for the total contamination level and/or contamination level of one or more of the discrete paths may be provided.

The gas flowrate through the instrument is preferably controlled. The flowrate may be adjusted in response to signals indicative of the flowrate. The flowrate may be adjusted by adjusting the speed of the fan. The signals indicating the flowrate may arise from an anerometer.

A gas flowrate of between 1 and 3 m/s is preferred. A gas flowrate of between 1.25 and 2.75 m/s, and more preferably between 1.5 and 2.5 m/s, may be provided, particularly where the inner seal is open and/or where the inner seal is open and the outer seal is shut.

A gas flowrate of between 1.25 and 1.75 m/s, and preferably between 1.4 and 1.6 m/s, may be provided where the outer seal is closed and/or where the outer seal is closed and the inner seal is open.

The optimum gas flowrate for the inner valve open may increase as the length of the item being monitored increases. A flowrate of 1.5 m/s+/−10% is preferred for a 1.75 to 2.25 meter length of item. A flowrate of 2 m/s+/−10% is preferred for a 3.5 to 4.5 meter length of item. A flowrate of 2.5 m/s+/−10% is preferred for a 5 to 7 meter length of item.

The enclosed volume may be elongate about an axis. A square, rectangular or circular cross-section volume, across the axis, may be provided.

Preferably only one inlet and/or one outlet is provided. Preferably the inlet and/or outlet oppose one another.

The electric field may be formed by the application of an electrical potential to an electrically conducting wall or portion thereof, of the volume and/or to a discrete conductor.

The electric field may be formed between two or more conductors. Two or more conductors with applied potential and/or two or more conductors of a different potential, such as earthed, may be used. Applied potential conductors and different potential conductors may be paired with one another. The number of applied or different potential conductors may exceed the other, preferably by one.

Two or more of the applied potential conductors may be connected together. Alternatively or additionally two or more of the different potential conductors may be connected together.

The current is preferably detected by an electrometer.

The current in the applied potential and/or different potential conductors may be determined.

The method may include the filtering of gas entering the volume and/or exiting the volume. The gas may be filtered to remove particulate matter and/or ions. Preferably the gas is the ambient gas for the monitoring location, most preferably air.

The plurality of electrical conductors may include a wall of the volume or a portion thereof.

Preferably the item is supported within the volume to provide a flow of gas over substantially all the item's surface. The item may be supported on a frame or cradle. Preferably the item is supported in general alignment with the volume's axis.

Preferably the discrete flow paths are aligned with the electrical conductors and/or with the volumes axis. It is particularly preferred that the inlet, the item'discrete flow path(s), the electrical conductors and the outlet all be generally aligned along a common axis.

The item may be supported such that the axis of the volume passes along one of its discrete flowpaths. Where the item has an inner discrete path, preferably this path is aligned with the axis and/or center-line of the volume.

The first aspect of the invention may include any of the options, possibilities, features and the like set out elsewhere in this application.

According to a second aspect of the invention we provide a method for detecting alpha sources on and/or associated with an item, the method comprising providing the item in an enclosed volume, providing a flow of gas from an inlet to the volume past the item to an outlet, the gas passing the item and, at least in part, passing through an electric field formed by an electrical potential on an electret, the variation in the electrical potential of the electret being detected.

The electret may be planar. The electret may be provided at an angle to the gas flow. The electret may be provided perpendicular to the gas flow. The gas flow may impinge on the electret.

The electret may comprise fluorocarbon polymer and/or high electrical resistance polymers. FEP or PTFE Teflon offer suitable materials.

The electret may have a thickness less than 500 mm thick, and more preferably less than 200 mm thick. A thickness of at least 1 mm may be provided. Electrets of different thicknesses may be provided.

Two or more electrets may be provided. Electrets of opposing polarities may be provided. The electrets may be provided in opposition to one another. The electrets may be aligned with the gas flow direction, i.e. parallel thereto.

An uncharged detector cap may be provided between the source of the ions and the electret. The ions may be electrostatically attracted to the cap by the electret. Preferably the cap is transparent to the electrostatic field. The cap may be spaced from or in contact with the electret. The change in the electrical potential of the cap may be measured.

The second aspect of the invention may include any of the features, options, possibilities, structures and stages set out elsewhere in this document.

According to a third aspect of the invention we provide a method for detecting alpha sources on and/or associated with an item, the method comprising providing the item in an enclosed volume, providing a flow of gas from an inlet to the volume past the item to an outlet, the gas passing the item and, at least in part, passing through an electric field formed by an electrical potential, ions in the gas being attracted to the electrical potential, the discharge of the ions being detected.

The electrical potential may be provided by an electret. The discharge of the ions may be detected by monitoring the change in electrical potential.

The electrical potential may be provided by the application of an electrical potential to at least one of a pair of electrical conductors. The discharge of the ions may be detected by monitoring the current arising.

The third aspect of the invention may include any of the options, possibilities, features and the like set out elsewhere in this application.

According to a fourth aspect of the invention we provide apparatus for detecting alpha sources on or associated with an item, the apparatus comprising an enclosed volume having an inlet and an outlet, the enclosed volume providing a location area for the item and a detection area, the detection area being provided with a plurality of electrical conductors, a potential being applied to at least one of the electrical conductors to provided an electrical field between at least two of the conductors, means for providing a flow of gas from an inlet to an outlet, at least part of the gas flow passing through the electric field, and current detection means connected to at least one of the conductors.

Preferably the volume is elongate. Preferably the inlet is provided at one of the ends and the outlet is provided at an opposing end. The volume may be of square, rectangular or, more preferably, circular cross-section about an axis. A cylinder provides a preferred configuration for the volume. Preferably the inlet and/or outlet are provided on the axis of the cylinder.

Preferably the item location area is nearer the inlet than the detection area is.

Preferably an item support frame or cradle is provided. The item support frame may be removable from the item location area. Preferably the support separates the item from the wall(s) of the volume. In this way air flow all around the item is ensured. The support may be adjustable to accommodate different types and/or different sizes of item. Preferably the item is supported with its longest axis generally aligned with the longest axis of the volume.

The item and/or the apparatus may define one or more, and preferably two or more, discrete flow paths over its surface or surfaces. A pipe may therefore define an inner discrete flow path and an outer discrete flow path over its inner and outer surfaces respectively. Alternatively the apparatus may combine with the item to divide the items surface into a number of discrete flow paths.

Preferably the apparatus is provided with means for controlling the flow of gas along one or more of the discrete flow paths. Preferably the means block or restrict the flow of gas along a given flow path. Preferably a plurality of means are provided to restrict or block flow along a plurality of flow paths. Preferably the means are discrete to provide restrict or block one or more discrete flow paths separately as required.

The means may comprise a seal. The seal may be inflatable, preferably to varying degrees. Preferably the inflatable seal is capable of uneven inflation. In this way non-uniform items can be sealed. The seal is preferably variable and/or flexible in its sealing configuration. An iris type seal may be provided.

One or both of the seals may be provided of electrically conducting material, for instance carbon impregnated rubber.

The means may comprise an element adapted to extend into the volume from one or more of the walls thereof to a variable extent. The means preferably extend around the entire perimeter of the volume. In this way a seal around the entire outside of the item can be provided. Preferably in the blocking configuration the means extend from the outside surface of the item to the wall of the volume. Where a cylindrical cross-section volume is employed the means may extend into the cylindrical cross-section to reduce the effective diameter of the cross-section.

Alternative or additional means may be provided within the volume. Preferably the means are provided substantially centrally and/or axially within the volume. Preferably the means are positioned proximate to or within a flow path through an item, in the case of a pipe for instance, within the pipe. Preferably such means can be extended across the cross-section of the volume as required. The radial extent of the means relative to the axis of the volume may be variable both in extent and in different directions.

Restricting and/or blocking of a flow path may be provided by introducing or removing such means or by varying the configuration of the means at the location of use so as to restrict or block the flow path, for instance by inflation or by re-orientating the means.

The restriction or blocking means may be used to control the cross-sectional area of a flow path. In this way the flow rates along one or more discrete flow paths can be regulated relative to one or more other flow paths.

The plurality of electrical conductors may include a wall of the volume, and/or a portion thereof. The electric field may be provided between a single electrical conductor and a wall, or a portion of a wall, of the volume. The plurality of electrical conductors may comprise a pair of electrical conductors insulated from the wall of the volume.

The electrical potential may be applied to a plurality of electrical conductors. A plurality of opposing electrical conductors at a different potential may be applied. The different potential may be earth. Preferably each applied potential conductor is provided between a pair of different potential conductors. Each different potential conductor may be provided between a pair of applied potential conductors. The number of applied potential or different potential conductors may exceed the number of the other, preferably by one.

The applied potential conductors and/or different potential conductors may be connected together, preferably in series.

The current detector may be connected to one or more applied potential conductors. The current detector may be connected to one or more different potential conductors. One or more current detectors may be connected to one or more of the applied potential conductors and one or more current detectors may be connected to one or more of the different potential conductors. Ions of both polarities may therefore be detected at the same time.

Preferably a plurality of conductors are provided across the cross-section of the volume and/or across the gas flow path. Preferably all or substantially all of the gas flow passes through an electric field.

The electrical conductors may comprise plates, grids, meshes or wires and/or mixtures thereof. The conductors may be linear, planar or cylindrical forms and/or mixtures thereof.

The applied potential may be the same for each of the applied potential conductors or different potentials may be applied.

The current detection means may comprise an electrometer.

Preferably a filter is provided between the inlet to the volume and the item location. Preferably the filter is a particulate matter and/or ion filter. In this way the air flow to the apparatus is free of contamination or ions from the ambient air which might otherwise give a false reading.

Preferably the air flow through the volume is provided by a fan. Preferably the fan is provided between the detection unit and the outlet. Preferably the speed of the fan is adjustable, so as to enable the gas flow through the instrument to be varied.

Measuring means may be provided within the instrument, for instance in the enclosed volume, to measure the flowrate or speed. The means may comprise an anemometer.

A reference or control source of alpha particles and/or ions may be provided within the instrument. The control source may introduce ions into the flow to be detected in one configuration and/or may be restricted from introducing ions into the flow in a second configuration. The two configurations may involve exposing the source to a gas flow in one configuration and not in the other. The source may be provided within an open ended tube. The tube may be aligned with the gas flow in one configuration but not in the other.

A filter, preferably a particulate filter, is provided between the detector and the outlet. Most preferably the filter is provided between the detector location and the fan. A HEPA filter may be used.

Preferably the filter assembly and/or fan/detector assembly can be moved to allow access to the item location.

The fourth aspect of the invention may include any of the options, possibilities, features and the like set out elsewhere in this application.

According to a fifth aspect of the invention we provide apparatus for detecting alpha sources on and/or associated with an item, the apparatus comprising an enclosed volume having an inlet and an outlet, the enclosed volume providing a location area for the item and a detection area, the detection area being provided with an electret, the electrostatic potential of the electret providing an electric field, means being provided for generating a flow of gas from the inlet to the outlet, at least part of the gas passing through the electric field, and means for monitoring the variation in the electrical potential of the electret.

The electret may be planar. The electret may be provided at an angle to the gas flow. The electret may be provided perpendicular to the gas flow. The gas flow may impinge on the electret.

The electret may comprise fluorocarbon polymer and/or high electrical resistance polymers. FEP or PTFE Teflon offer suitable materials.

The electret may have a thickness less than 500 mm thick, and more preferably less than 200 mm thick. A thickness of at least 1 mm may be provided. Electrets of different thicknesses may be provided.

Two or more electrets may be provided. Electrets of opposing polarities may be provided. The electrets may be provided in opposition to one another. The electrets may be aligned with the gas flow direction, i.e. parallel thereto.

An uncharged detector cap may be provided between the source of the ions and the electret. The ions may be electrostatically attracted to the cap by the electret. Preferably the cap is transparent to the electrostatic field. The cap may be spaced from or in contact with the electret. The change in the electrical potential of the cap may be measured.

The fifth aspect of the invention may include any of the features, options, possibilities, structures and stages set out elsewhere in this document.

According to a sixth aspect of the invention we provide apparatus for detecting alpha sources on and/or associated with an item, the apparatus comprising an enclosed volume having an inlet and an outlet, the enclosed volume providing a location area for the item and a detection area, the detection area being provided with an electrical potential giving an electric field, means being provided for generating a flow of gas from the inlet to the outlet, at least part of the gas passing through the electric field and means for monitoring the discharge of ions.

The electrical potential may be provided by an electret. The discharge of the ions may be detected by monitoring the change in electrical potential.

The electrical potential may be provided by the application of an electrical potential to at least one of a pair of electrical conductors. The discharge of the ions may be detected by monitoring the current arising.

The sixth aspect of the invention may include any of the options, possibilities and features set out elsewhere in this document.

According to a seventh aspect of the invention we provide items, articles, pipes, ducts, scaffolding or parts thereof, having a determined alpha contamination level, which level has been determined using the method of the first aspect and/or the apparatus of the second aspect of the invention.

The alpha contamination level may have been determined as an absolute value. Alternatively or additionally the alpha contamination level may have been determined with respect to one or more threshold values. The categorization of the item or part thereof as "high level", "low level" or "non-contaminated is envisaged.

The items may be provided together with an indication of the level detected.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
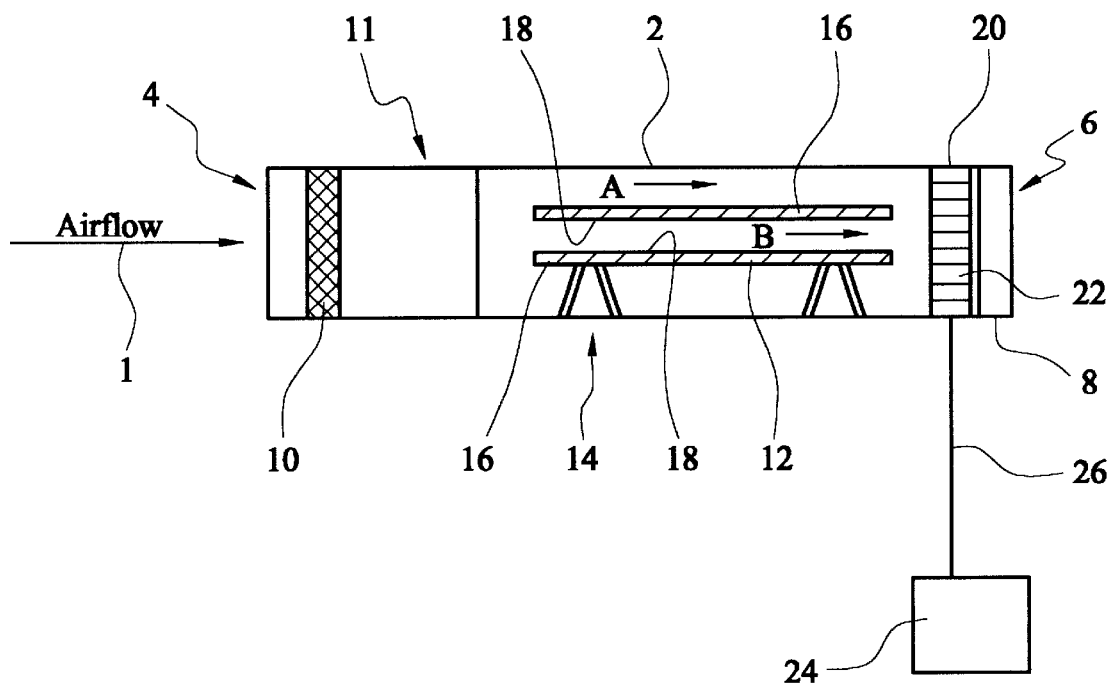
FIG. 1 schematically illustrates an embodiment of the invention in sectional side view in a first monitoring configuration.

The apparatus provides an elongate measuring chamber 2 defining an inlet end 4 and an outlet end 6. Air 1 is drawn through the measurement chamber 2 from inlet 4 to outlet 6 by means of a fan unit 8.

At the inlet 4 the measuring chamber 2 is provided with a filter 10 through which all of the air passes. The air is filtered to remove suspended particulate matter and also to remove any existing ions in the air feed to the apparatus.

The filter containing assembly 11 can be detached from the measuring chamber 2. The item, in this case a pipe 12, is supported clear of the walls of the measurement chamber 2 by a cradle 14.

As can be seen, in this monitoring configuration, the external surface 16 and internal surface 18 of the pipe 12 are generally aligned with the air flow through the apparatus.

Between the pipe 12 and the fan 8 the apparatus is provided with the detection unit 20, described in more detail below.

In use, in the first monitoring configuration, air is drawn by the fan 8 through filter 10 and past the pipe 12. The air flows both over the external surface 16, flow arrow A, and also over the inner surface 18 of the pipe 12, flow arrow B.

Once clear of the pipe 12 the air from over the external surface 16 and from over the internal surface 18 passes between detector plates 22 forming part of the detection unit 20.

Alpha particles emitted into air only travel a few centimeters, they would not be detectable by the distant detector unit 20. However, during the course of their travel through the air the alpha particles cause ionization of a significant number of air molecules. These ionized molecules remain in that state for a significant time and can be swept from proximity with the pipe surfaces 16,18 to the detector plates 22 before they recombine.

By applying a potential to the plates 22 within the detection unit 20 an electric field can be generated between them. Charged particles, the ionized air molecules, entering this field are attracted to the plates 22 having an opposing applied potential. The current resulting from these ions are detected by electrometer 24 via electrical connection 26.

The current can be equated to a given level of contamination using pre-obtained calibration data. A value for the overall contamination is thus obtained. This alone gives only limited information about the contamination and its location. By using a further configuration for monitoring, however, the information can be supplemented.

Whilst it is preferred that the item being monitored is electrically conducting to the extent of being non-insulating, measurements with insulated items can be made provided sufficient time is allowed for the natural charge to decay. Whilst a nature charge persists on the item ions generated by the alpha particles are attracted to it and the number of ions detected by the monitor is depressed.

Figure 2:
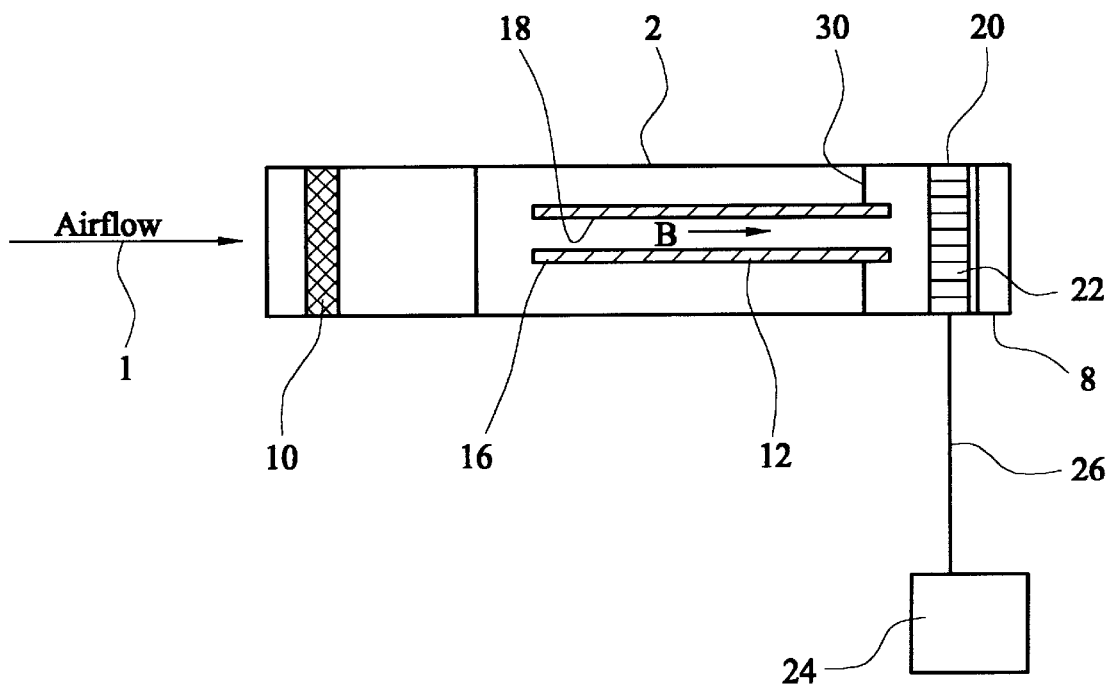
FIG. 2 schematically illustrates the apparatus of FIG. 1 in a second monitoring configuration.

In a further configuration, illustrated in FIG. 2, for instance, the apparatus and pipe are the same as for FIG. 1. However, during the monitoring procedure the air drawn through the measuring chamber 2 can only pass down through the inside of the pipe 12 and hence over inner surface 18. The flow path around the outside of the pipe 12 is blocked by seal 30. The seal 30 consists of an inflatable bladder which can be inflated to take up the shape of the flow path between the inside surface of the measuring chamber wall and the outside surface 16 of the pipe 12 at that location. The flexible nature of the material forming the inflatable seal ensures that it fully takes up the shape of the flow path and so ensures that no air flow along flow path arrow A is possible in this configuration. Inflation of the seal to a high level ensures that it fully takes up the outer surface shape of the item, even where irregular surface shapes are encountered.

The detection unit 20 is as for FIG. 1 and detects the ionized air molecules in the same way. The result this time, however, gives a reading for the level of contamination on the inner surface 18 alone.

To revert the instrument to the detection configuration of FIG. 1 the bladder can be deflated. This allows air flow along path A once more.

Figure 3:
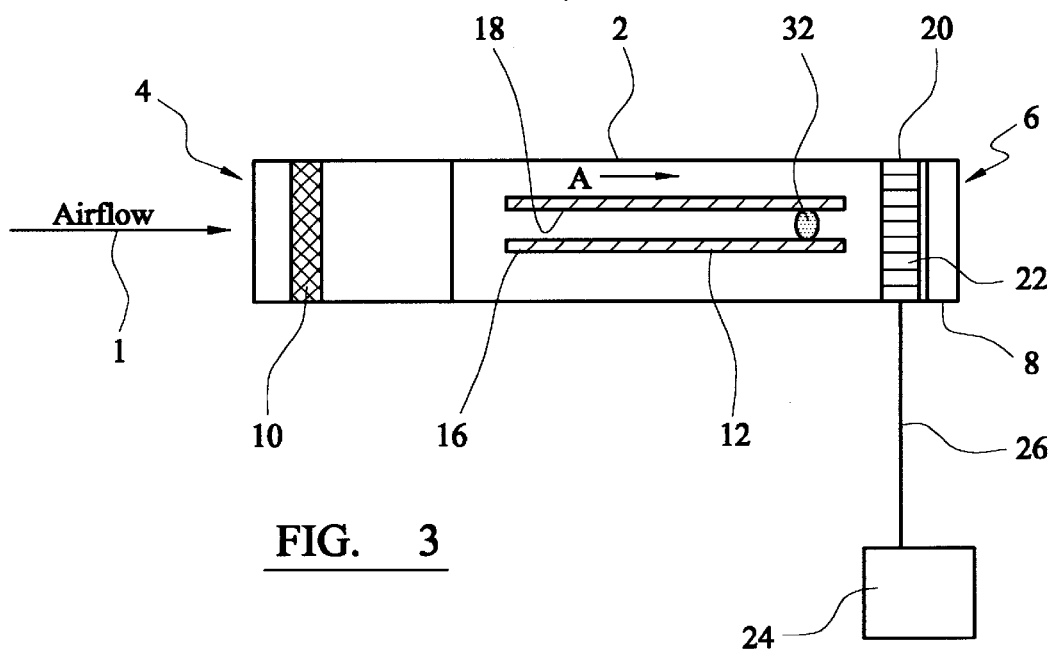
FIG. 3 schematically illustrates the apparatus of FIG. 1 and FIG. 2 in a third monitoring configuration.

In an alternative further configuration, illustrated in FIG. 3, the flow path through the inside of the pipe 12 is blocked by an inflatable bladder 32. This prevents air flow over the inner surface 18 and ensures that only air which has flowed over the outer surface 16, arrow A, reaches the detection unit 20. Once again the flexible material forming the bladder 32 ensures a complete seal between the bladder and the inner surface 18 of the pipe. With irregular shaped articles the radial extent of the seal varies to fully take up a sealing shape.

The ionized molecules detected in this configuration give a reading for the external surface contamination alone.

The instrument can revert to the monitoring configuration of FIG. 1 by deflating the bladder 32.

It is preferred that the inner bladder 32 which acts as one seal and/or the outer bladder 30 which acts as the other seal being non-insulating. Carbon impregnated rubber offers a suitable material for the inner and/or outer bladders. The outer seal may be in the form of an iris valve. The inner seal may be in the form of a gag valve.

Both alternative configurations can be employed or the result for one can be determined by subtracting the alternative used from the total value. The alternatives can be used as a cross-check for the total result, or replace it by adding the two results together.

The control of the air flow through the instrument is important in obtaining optimized detection. To monitor the flow rates an anemometer is provided and the fan speed is adjusted according to the results obtained to get the best conditions.

To facilitate the calibration of the instrument a tube can be placed between the inlet filter and the detector locations and brought into and taken out of alignment with the air flow. When aligned ions generated by an alpha source within the tube are swept through the instrument and detected. When out of alignment practically none of the ions are swept through the instrument and a background only signal is achieved. The source enables accurate calibration irrespective of ambient conditions due to its known ion generating properties. Additionally the source provides a check to ensure that the instrument is functioning and the extent to which it is functioning.

Figure 4:
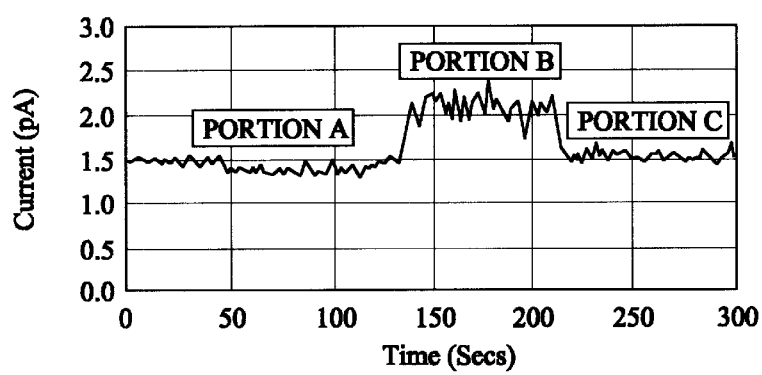
FIG. 4 illustrates monitoring results for an instrument according to the invention.
Figure 5:
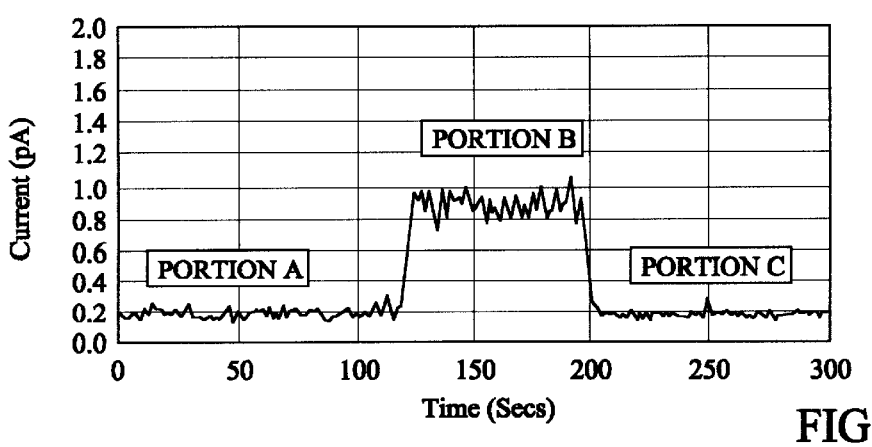
FIG. 5 illustrates monitoring results from an instrument according to the invention under optimized conditions.

As an illustration of the technique detection results were obtained for an instrument having the general structure outlined above. The detection unit 20 produced the results indicated in FIG. 4, initially due to background radiation only (typically from radon gas and cosmic rays), portion A and portion C; but also due to the presence of an 140Bq Am241 alpha source 4 meters from the detection plates, portion B. Portion B represents the total reading for both inner and outer surfaces of the pipe. A plot for a refined set of conditions for the same source at 2 meters for the detector is shown in FIG. 5. Similar portions A, B and C are featured but with a lower background signal level and better discrimination as a result.

Similar tests were also conducted with a variety of source locations, for a 348 Bq alpha source, on the inner or outer surface and with the outer seal 30 either open or shut, with the following results.

| Source Location | Outside Valve Status | Electrometer Response pA | Corrected Response pA |
| --- | --- | --- | --- |
| BACKGROUND | OPEN | 1.4 | 0.0 |
| INSIDE SURFACE | OPEN | 4.2 | 2.8 |
| INSIDE SURFACE | CLOSED | 4.4 | 3.0 |
| OUTSIDE SURFACE | OPEN | 4.5 | 3.1 |
| OUTSIDE SURFACE | CLOSED | 1.3 | −0.1 |

Each measurement was conducted over a period of 300 seconds and air flow velocity through the detection unit was maintained constant.

Through subsequent optimization of the detection method for a 348 Bq alpha source at the specified locations, with a detection period of 100 seconds and optimized air flow rates, the following results were achieved.

| Source Location | Outside Valve Status | Electrometer Response pA | Corrected Response pA |
| --- | --- | --- | --- |
| BACKGROUND | OPEN | 0.45 | 0.00 |
| INSIDE SURFACE | OPEN | 2.06 | 1.61 |
| INSIDE SURFACE | CLOSED | 2.26 | 1.81 |
| OUTSIDE SURFACE | OPEN | 2.06 | 1.61 |

The air flow rate through the instrument is significant to its optimum operation. The table set out below provides details of preferred and optimum flowrates with the Gag valve open or shut and for different module lengths. The module length equates to the addition of a longer tube to allow longer items to be monitored.

| LENGTH | GAG VALVE OPEN | | GAG VALVE SHUT | |
| --- | --- | --- | --- | --- |
| meters | REFERRED | OPTIMUM | PREFERRED | OPTIMUM |
| 2 | 1 TO 2 | 1.5 | 1 TO 2 | 1.5 |
| 4 | 1.5 TO 2.5 | 2 | 1 TO 2 | 1.5 |
| 6 | 2 TO 3 | 2.5 | 1 TO 2 | 1.5 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for detecting alpha sources comprising:
   positioning an item having an alpha source within an enclosed chamber, the item at least partially bounding a first flow path and a second flow path within the chamber, at least a portion of the first flow path being isolated from the second flow path;
   selectively blocking the first flow path within the chamber so that the second flow path remains open;
   passing a flow of gas from an inlet of the chamber to an outlet of the chamber such that the gas flows through the second flow path but is blocked from passing through the first flow path, the alpha source producing ions within the gas as the gas flows through the second flow path;
   applying an electrical field to the gas after it has passed through the second flow path such that the ions in the gas are attracted by the electrical field; and
   detecting the ions attracted by the electrical field.

2. A method according to claim 1 wherein the first flow path is at least partially bounded by an interior surface of the item and the second flow path is at least partially bounded by an exterior surface of the item.

3. A method according to claim 1 wherein the act of blocking the first flow path comprises sealing the first flow path.

4. A method according to claim 3 in which the seal is provided between the item and a wall bounding the chamber or across a flow path defined solely by the item.

5. A method according to claim 1 in which the first flow path is blocked by an inflatable seal.

6. A method according to claim 1 in which the first flow path is blocked by a variable aperture seal.

7. A method according to claim 1 further comprising:
   unblocking the first flow path; and
   selectively blocking the second flow path.

8. A method according to claim 1 wherein the electrical field is produced by an electret.

9. A method according to claim 1 wherein the electrical field is produced by applying an electrical potential to an electrical conductor disposed within the chamber.

10. A method according to claim 1 wherein the item is a pipe.

11. A method according to claim 1 wherein the second flow path is at least partially bounded by an exterior surface of the item and the first flow path is at least partially bounded by an interior surface of the item.

12. A method according to claim 1 further comprising blocking the first flow path at an end thereof nearest to the outlet of the chamber.

13. A method according to claim 1 further comprising passing the flow of gas at a rate in a range between 1 m/s and 3 m/s.

14. An apparatus for detecting alpha sources on or associated with an item, the apparatus comprising:
   a housing bounding a chamber, the chamber being in fluid communication with an inlet and an outlet, the chamber being adapted to receive an item having an alpha source, the item at least partially bounding a first flow path and a second flow path when the item is disposed within the chamber, at least a portion of the first flow path being isolated from the second flow path;
   means for providing a flow of gas from the inlet to the outlet so as to enable the gas to flow through the first flow path and the second flow path when the item is disposed within the chamber;
   means disposed within the chamber for selectively blocking the first flow path or the second flow path so that the unblocked flow path remains open;
   an electrical conductor disposed within the chamber, the electrical conductor being adapted to receive an electrical potential so as to produce an electrical field; and
   a current detector electrically coupled with the electrical conductor.

15. An apparatus according to claim 14, wherein the means for selectively blocking comprises a seal.

16. An apparatus according to claim 15, wherein the seal is inflatable.

17. An apparatus according to claim 14, wherein the means for selectively blocking comprises an element variably extending into the chamber from the housing.

18. An apparatus according to claim 17, wherein the element encircles at least a portion of the chamber.

19. An apparatus according to claim 14, further comprising a plurality of seals disposed within chamber so as to block a plurality of discrete flow paths.

20. An apparatus for detecting alpha sources on or associated with an item, the apparatus comprising:
   a housing bounding a chamber, the chamber being in fluid communication with an inlet and an outlet, the chamber being adapted to receive an item having an alpha source, the item at least partially bounding a first flow path and a second flow path when the item is disposed within the chamber, at least a portion of the first flow path being isolated from the second flow path;
   means for providing a flow of gas from the inlet to the outlet so as to enable the gas to flow through the first flow path and the second flow path when the item is disposed within the chamber;
   means disposed within the chamber for selectively blocking the first flow path or the second flow path so that the unblocked flow path remains open;
   an electret disposed within the chamber, the electrostatic potential of the electret providing an electric field; and
   means for monitoring the variation in the electrostatic potential of the electret.

21. An apparatus according to claim 20, wherein the means for selectively blocking comprises a seal.

22. An apparatus according to claim 20, wherein the means for selectively blocking comprises an element variably extending into the chamber from the housing.

* * * * *

UNITED STATES PATENT AND TRADEMARK OFFICE
CERTIFICATE OF CORRECTION

PATENT NO.      : 6,455,859 B1  
DATED           : September 24, 2002  
INVENTOR(S)     : Christopher Henry Orr et al.

It is certified that error appears in the above-identified patent and that said Letters Patent is hereby corrected as shown below:

<u>Title page,</u>
Insert the following below Item [75]:
-- [73] Assignees:     British Nuclear Fuels PLC, Cheshire (UK)
                      The Regents of the University of California, Oakland, CA (US) --

<u>Column 1,</u>
Line 7, before the paragraph beginning on line 7 insert the following heading:
-- STATEMENT REGARDING FEDERALLY SPONSORED RESEARCH OR DEVELOPMENT --

<u>Column 3,</u>
Line 30, change "item'discrete" to -- item's discrete --
Line 34, change "flowpaths" to -- flow paths --
Line 35, change "provided" to -- provide --

<u>Column 8,</u>
Line 60, change "are" to -- is --

<u>Column 12,</u>
Line 38, after "within" insert -- the --

Signed and Sealed this

Thirteenth Day of May, 2003

JAMES E. ROGAN
*Director of the United States Patent and Trademark Office*